United States Patent
Klippstein et al.

(10) Patent No.: US 10,310,302 B2
(45) Date of Patent: Jun. 4, 2019

(54) SCREEN FOR A FREE VIEWING MODE AND A RESTRICTED VIEWING MODE

(71) Applicant: siOPTICA GmbH, Jena (DE)

(72) Inventors: Markus Klippstein, Jena (DE); Uwe Schroeter, Dornburg-Camburg (DE); Juergen Schwarz, Apolda (DE)

(73) Assignee: siOPTICA GmbH, Jena (DE)

( * ) Notice: Subject to any disclaimer, the term of this patent is extended or adjusted under 35 U.S.C. 154(b) by 0 days.

(21) Appl. No.: 16/060,869

(22) PCT Filed: Dec. 9, 2016

(86) PCT No.: PCT/EP2016/080422
§ 371 (c)(1),
(2) Date: Jun. 8, 2018

(87) PCT Pub. No.: WO2017/097975
PCT Pub. Date: Jun. 15, 2017

(65) Prior Publication Data
US 2019/0004346 A1    Jan. 3, 2019

(30) Foreign Application Priority Data

Dec. 10, 2015   (DE) .................. 10 2015 016 134
Feb. 29, 2016   (DE) .................. 10 2016 002 584

(51) Int. Cl.
*F21V 8/00*     (2006.01)
*G02B 5/02*     (2006.01)
(Continued)

(52) U.S. Cl.
CPC .......... *G02F 1/1323* (2013.01); *G02B 5/0242* (2013.01); *G02B 5/0268* (2013.01);
(Continued)

(58) Field of Classification Search
CPC ..... G02F 1/1323; G02B 5/0242; G02B 5/068; G02B 5/0278; G02B 6/0041
(Continued)

(56) References Cited

U.S. PATENT DOCUMENTS 5,881,201 A *  3/1999  Khanarian ........... G02B 6/0041
                                              385/146
5,956,107 A    9/1999  Hashimoto et al.
(Continued)

FOREIGN PATENT DOCUMENTS

CN   106030388 A    10/2016
DE   100 45 407 A1   3/2002
(Continued)

*Primary Examiner* — Bryon T Gyllstrom
(74) *Attorney, Agent, or Firm* — Christensen, Fonder, Dardi & Herbert PLLC

(57) ABSTRACT

A screen for operation in a free viewing mode or a restricted viewing mode, comprising: an image reproduction unit, a plate-shaped transparent light guide in front of the image reproduction unit and luminous means arranged on sides of the light guide. The image reproduction unit is arranged behind the light guide. In the free-viewing mode, the luminous means are switched off, with the result that the light which comes from the image reproduction unit and onto which image information is modulated passes through the light guide substantially without influence. The luminous means are switched on in the restricted-viewing mode. A light emission characteristic is generated either on the basis of scattering particles which are distributed spatially and/or in terms of the concentration in the light guide or on the basis of coupling elements arranged on at least one of the large surfaces of the light guide.

18 Claims, 6 Drawing Sheets

(51) Int. Cl.
    *G02F 1/13*              (2006.01)
    *G02F 1/13357*       (2006.01)

(52) U.S. Cl.
    CPC ......... *G02B 5/0278* (2013.01); *G02B 6/0041* (2013.01); *G02F 1/1336* (2013.01)

(58) Field of Classification Search
    USPC .......................................... 362/612
    See application file for complete search history.

(56) References Cited

U.S. PATENT DOCUMENTS

| | | | |
|---|---|---|---|
| 5,993,940 A | 11/1999 | Ouderkirk et al. | |
| 6,765,550 B2 | 7/2004 | Janick et al. | |
| 8,434,909 B2* | 5/2013 | Nichol | G02B 6/0018 362/296.01 |
| 8,820,997 B2* | 9/2014 | Minami | G02B 27/2214 362/602 |
| 8,876,349 B2* | 11/2014 | Minami | G02B 6/0036 362/602 |
| 9,268,148 B2* | 2/2016 | Minami | G02B 5/0215 |
| 9,285,597 B2* | 3/2016 | Minami | G02B 6/0043 |
| 9,881,531 B2 | 1/2018 | Klippstein et al. | |
| 2002/0063813 A1* | 5/2002 | Dirscherl | G02F 1/133617 349/61 |
| 2006/0291055 A1* | 12/2006 | Gehlsen | G02B 5/0242 359/485.03 |
| 2007/0008456 A1 | 1/2007 | Lesage et al. | |
| 2008/0030861 A1* | 2/2008 | Ookubo | C08J 7/047 359/601 |
| 2008/0079866 A1 | 4/2008 | Mimura et al. | |
| 2009/0067156 A1 | 3/2009 | Bonnett et al. | |
| 2010/0177533 A1 | 7/2010 | Griffiths et al. | |
| 2011/0124412 A1* | 5/2011 | Ando | A63F 13/10 463/31 |
| 2011/0249939 A1 | 10/2011 | Schmidt et al. | |
| 2012/0051696 A2 | 3/2012 | Schmidt et al. | |
| 2012/0235891 A1 | 9/2012 | Nishitani et al. | |
| 2013/0114292 A1* | 5/2013 | Brick | G02B 6/0041 362/608 |
| 2013/0308185 A1 | 11/2013 | Robinson et al. | |
| 2016/0170128 A1* | 6/2016 | Groothues | G02B 6/0043 362/624 |
| 2017/0069236 A1* | 3/2017 | Klippstein | G02F 1/1323 |

FOREIGN PATENT DOCUMENTS

| | | |
|---|---|---|
| DE | 10 2014 003 298 A1 | 9/2015 |
| DE | 10 2014 033 298 A1 | 9/2015 |
| GB | 2 428 128 A | 1/2007 |
| JP | 2007-155783 A | 6/2007 |
| JP | 2012-515416 A | 7/2012 |
| JP | 2013-527968 A | 7/2013 |
| TW | 201706685 A | 2/2017 |
| WO | WO 2011/124412 A1 | 10/2011 |
| WO | WO 2012/033583 A1 | 3/2012 |
| WO | WO 2015/010871 A1 | 1/2015 |
| WO | WO 2015/121398 A1 | 8/2015 |
| WO | WO 2017/089482 A1 | 6/2017 |

\* cited by examiner

SCREEN FOR A FREE VIEWING MODE AND A RESTRICTED VIEWING MODE

The present application is a National Phase entry of PCT Application No. PCT/EP2016/080422, filed Dec. 9, 2016, which claims the benefit of German Patent Application No. 10 2015 016 134.2, filed Dec. 10, 2015 and German Patent Application No. 10 2016 002 584.0, filed Feb. 29, 2016, which are incorporated herein by reference in their entireties.

FIELD OF THE INVENTION

In recent years, great strides have been made in enlarging the visual angle of LCDs. Frequently, however, there are situations in which such a very large angular viewing range of a screen can be a disadvantage. Increasingly, information such as banking data or other private particulars and sensitive data becomes available on mobile devices such as notebooks and tablet PCs. Accordingly, users require some control of who is allowed to see such sensitive data; they must be able to choose between a wide viewing angle in order to share displayed information with others, e.g., when looking at vacation snaps or reading advertisements, and a narrow viewing angle in order to keep displayed information secret.

BACKGROUND OF THE INVENTION

Accessory films based on micro-louvers have already been used on mobile display screens to achieve optical data protection in a so-called privacy mode. However, such films are not capable of being switched between modes but have to be applied and removed manually. Also, they have to be carried separately from the display screen when not in use. Another substantial disadvantage is the light loss accompanying the use of such louver films U.S. Pat. No. 6,765,550 describes such privacy protection provided by a filter of micro-louvers. Here, the biggest disadvantages are the need to mechanically attach or remove the filter, and the light loss in the protected mode.

U.S. Pat. No. 5,993,940 describes the use of a film the surface of which is provided with small, regularly arranged prismatic strips to create a privacy mode. The development and fabrication of this film are quite complicated.

In WO 2012/033583, switching between free and restricted viewing is effected by the triggering of liquid crystals arranged between so-called "chromonic" layers. This involves a light loss, and implementation is rather complicated, too.

US 2009/0067156 discloses a great number of ideas to configure an illuminating system and a display device. In particular, the version illustrated there in FIGS. 3A and 3B uses two backlights consisting of wedge-shaped light guides, and an LCD panel, where the posterior backlight 40 is intended to positively create a wide illuminating angle, and the anterior backlight 38 is intended to positively create a narrow illuminating angle. It remains unclear, however, in what manner the backlight 38 is meant to create a narrow illuminating angle without converting the light having a wide illuminating angle, originating from backlight 40, essentially into light having a narrow illuminating angle when it passes backlight 38.

Regarding the configuration shown in FIG. 5 of US 2009/0067156, it should be noted that the two light guides 46 and 48 each produce "narrow light", i.e. light with a narrow illuminating angle. Conversion of the light in light guide 48 into "wide light", i.e. light with a wide illuminating angle, is only achieved by means of a partial mirror 50, which has to be provided with prism structures in a complex process. This conversion extremely diminishes the light intensity, because the light that at first exits in a narrow illuminating angle (the only light available) is then spread out into a wide illuminating angle, as a rule into the semispace. As a result, the brightness (related to the luminance) will be reduced by a factor of 5 or higher, depending on the parameters. Thus, this configuration is of little practical relevance.

In the embodiment according to FIG. 7 of US 2009/0067156, a phosphorus layer that converts UV light into visible light is an absolute must. This is rather laborious to do; and given the aim to get sufficient light from the backlight to illuminate an LCD so that it can be read, one needs very high UV intensities. Therefore, this configuration is expensive and complicated; shielding off the UV radiation alone makes it impracticable.

US 2012/0235891 describes a highly complex backlight in a screen. According to FIGS. 1 and 15, this design employs not only several light guides but also other complex optical elements such as microlens elements 40 and prism structures, which convert the light coming from the posterior illumination on the way to the anterior illumination. This is expensive and complicated to implement, and it involves a light loss. According to the version shown in FIG. 17 in US 2012/0235891, both light sources 4R and 18 produce light having a narrow illuminating angle, with the light radiated by the posterior light source 18 first being laboriously converted into light with a large illuminating angle. This complex conversion greatly diminishes brightness, as noted already above.

According to JP 2007-155783, special optical surfaces 19 that are difficult to compute and to manufacture are used to deflect light into varied narrow or broad regions depending on the light incidence angle. These structures are similar to Fresnel lenses. Furthermore, there exist inactive edges, which deflect light into unwanted directions. Thus, it remains uncertain whether really useful light distributions can be achieved.

For achieving restricted vision as taught by GB 2428128 A, additional light sources, which are arranged at a distinct distance from the screen, and illuminate a hologram attached to the screen, are used to overlay the lateral view with special wavelengths. The disadvantages here are the necessary spacing of the light sources from the screen, and the complexity of making suitable holograms.

US 2013/0308185 describes a special light guide provided with steps, which radiates light at a large area into various directions, depending on the direction in which it is illuminated from an edge. In interaction with a transmissive imager, e.g., an LC display, a screen that is switchable between a free and a restricted viewing mode can be produced. Here, a disadvantage, among others, is that the restricted view effect can be created either for left/right or for top/bottom only, bot not for left/right/top/bottom simultaneously as desirable for certain payment actions. In addition, some residual light is visible from blocked viewing angles even in the restricted viewing mode.

Finally, DE 10 2014 003 298 A1 describes a method and arrangement for the optional restriction of the recognizability of images. For this, a special optical element is needed, which is transparent to at last 70% of the light emanating from the screen, and which deflects light incident from lateral light sources into a restricted angular range in such a way that, in directions extending at angles $\alpha$ greater than $\gamma$, with γ>20°, to the surface normal of the screen, The light emanating from the screen is superimposed with the light deflected by the optical element, only from angles β<γ to the surface normal of the screen.

The methods and arrangements mentioned above have, as a rule, the common disadvantages that they distinctly reduce the brightness of the basic screen, and/or require an active, but at least a special, optical element for switching between the modes, and/or are complicated and expensive to fabricate, and/or degrade resolution in the free viewing mode.

DESCRIPTION OF THE INVENTION

Departing therefrom, the problem of the invention is to describe a screen and a method by which a secure presentation of information can be implemented by way of an optionally restricted viewing angle, with a second operating mode enabling free vision with a viewing angle that is as unrestricted as possible. The invention is to be implementable by simple means and as low-prized as possible. In both operating modes, the highest possible resolution, with particular preference the native resolution of the screen used, is to be visible. Further, the invented solution is to cause the least possible light loss. Preferably, it is desirable to dispose that solution on the front face of the screen so that it can be employed for the greatest possible number of screen types, such as, e.g., LCD and OLED screens.

This task is solved by means of a screen that can be operated in at least two operating modes, viz B1 for a free viewing mode and B2 for a restricted viewing mode. Such a screen comprises an image display unit, one or several plate-shaped and transparent light guides located in front of the image display unit as seen in the viewing direction, and light sources arranged, as a rule, laterally along at least one of the edges of the light guide. The image display unit is arranged behind the light guide as seen in the viewing direction. The light guide has an average haze value of less than 20% measured according to ASTM D1003, or, in preferred embodiments, less than 10%, or, in particularly preferred embodiments, less than 5% or 4%.

In operating mode B1, the light sources are switched off, so that the light originating from the image display unit, which has image information modulated on it, will essentially pass the light guide unaffected. In operating mode B2, the light sources are switched on. In a first alternative of this mode, either due to scattering particles distributed in the light guide in space and/or regarding their concentration, or due to outcoupling elements arranged or formed on at least one of the large faces of the light guide, a light-radiating characteristic is produced at which the average luminance, measured at angles α relative to the surface normal of the at least one large face of the light guide with 0°≤α≤θ, is, with 10°≤θ≤60°, smaller by a factor X, with X≥1.2, than the highest luminance measurable on the same large face F1 of the light guide, radiated at angles α>θ relative to the surface normal. In other embodiments, the factor X may be ≥2.5, and/or the angle θ may be 10°, 30°, 30°, 45° or any other meaningful value.

In a second alternative, which may also be combined with the first alternative, the image display unit has a light-radiating characteristic at which, in the direction of the surface normal of the image display unit, a higher luminance is achieved than at an angle of α≥θ relative to the surface normal. An image display unit of that kind can be generated, e.g., if, in an LCD, one uses crossed sheets of OLF (optical lighting film) and/or BEF (brightness enhancement film) between the LCD panel and the backlight.

As a result, in operating mode B2, the light that originates from the image display unit and onto which image information is modulated, has light superimposed upon it that is emitted by the light guide surface over a wide angular range, whereby, from viewing angles α>θ, the visibility of the image information presented on the image display unit is reduced or even prevented.

Here, as in the following embodiments of the invention, the quantity of X may also be chosen to be different, such as, e.g., X≥4, 5, 6, 10, 20, 50, 100 or still greater. This quantity is a measure of how much more light is radiated by the light guide into viewing angles extending sideways compared with the light radiated in the direction of the surface normal. In particular, the angle θ can be specified as a function of the quantity of light; i.e., the angle θ can be influenced by the quantity of light irradiated: the greater the quantity of light, the more light is radiated in the direction of the surface normal.

In an advantageous embodiment of the invented screen, the light sources switched on in operating mode B2 along at least one of the edges of the light guide create, on at least one of the large faces F1 of the light guide, a light-radiating characteristic that has, in the angular range 0°≤α≤30°, an average luminance smaller by a factor X, with X≥2.5 (or also greater than 4, 5 etc.), than the highest (single) luminance measured in the angular range of 30°≤α≤90° relative to the surface normal.

In the ideal case, on at least one of the large faces F1 of the light guide, a light-radiating characteristic would prevail at which, in the angular range 0°≤α≤30° relative to the surface normal, almost no light is coupled out, and at which, in the angular range 30°≤α≤90° relative to the surface normal, light is radiated with a luminance that is possibly almost as high as, or even higher than, the luminance of the screen in this direction. However, this ideal case can hardly be realized in practice.

Here, the angle α can be measured along the horizontal, vertical and/or any other direction on the screen, but in any case relative to the surface normal. If the given conditions apply to horizontal and vertical angle measurement, the screen in operating mode B2 cannot be viewed at oblique angles from the left, right, top and bottom. If, however, the given conditions apply for horizontal angle measurement only, the screen in operating mode B2 cannot be viewed at oblique angles from the left and the right only, whereas viewing from the top and bottom is possible, as a rule.

In an advantageous embodiment of the invention, the scattering particles in the light guide—as far as provided in compliance with the first alternative—are incorporated in the form of microlouvers, with the microlouvers being embedded in a transparent, non-scattering material. Typically, the microlouvers may have a thickness between 30 μm and 150 μm and a height between 30 μm and 300 μm. The average center distance from microlouver to microlouver may be 40 μm and 150 μm, as a rule, although other values are possible. What is important is that the ratio of height to center distance is large enough to outcouple sufficient light when the microlouvers are viewed at an oblique angle.

Further, the microlouvers may be configured in parallel and/or crossed at some angle. If they are parallel, the result of light outcoupling from them is that light superimposition on the image information presented will reduce visibility in one dimension only, e.g., left-right or top-bottom. If, however, the microlouvers are configured to cross each other, e.g. in a rectangular manner, the result of light outcoupling from them is that light superimposition on the image information presented will reduce visibility in two dimensions, i.e., simultaneously left-right and top-bottom.

In one possible implementation thereof, the microlouvers consist of silicone rubber mixed with scattering particles. In this case, the scattering particles may be, e.g., titanium dioxide, barium sulfate or, silsesquioxane particles, and/or cross-linked polystyrene particles, with the microlouvers being embedded in transparent silicone rubber.

In that way, a radiation characteristic of the light guide can be achieved with which, in narrow angles relative to the surface normal of the light guide, markedly less light is coupled out than in wide angles (e.g., wider than 30 or 45 degrees) relative thereto, which is desired.

An altogether essential aim of the invention is a higher (relative) brightness of the light originating from the light guide compared to the light originating from the image display unit at angles to be blocked to view, whereas precisely the reverse is intended to apply to non-blocked angles; i.e., as seen from such viewing angles, the light of the image display unit is intended to be stronger than the superimposed light from the light guide.

Especially for this version of the invented screen it applies that the light guide may consist of a transparent thermoplastic or thermoelastic material and scattering particles distributed therein essentially homogeneously, the scattering particles consisting, e.g., of titanium dioxide, barium sulfate, silsesquioxane particles or cross-linked polystyrene particles. Other kinds of scattering particles are possible as well.

The preferred scattering particles in the transparent light guide are titanium dioxide particles of a mean particle size of 150 to 500 nm in a concentration of 0.01 to 300 wt.-ppm related to the weight of the respective light guide. With particular preference, the light guide(s) is/are made with a concentration of titanium dioxide scattering particles of 0.1 to 50 wt.-ppm or favorably 0.1 to 10 wt.-ppm, with the titanium dioxide particles having a mean particle size of 160 to 450 nm or, with particular preference, 170 to 400 nm. The haze value of such light guides, measured according to ASTM D1003, is within a range of 0.2 to 2%.

It is also possible, though, to use scattering particles of barium sulfate of a particle size of about 3 μm, of cross-linked polystyrene of a particle size of about 4 μm, or silsesquioxane of about 2 μm particle size in suitable concentrations. Also, the light guide 3 may contain polymethyl methacrylate in a quantity of at least 40 wt.-%, preferably at least 60 wt.-%, related to its weight.

In this way, a radiation characteristic of the light guide can be achieved in which, with narrow angles relative to the surface normal of the light guide, markedly less light is coupled out than in wide angles (e.g., greater than 30 or 45 degrees), which is desired and necessary within the scope of the invention.

Generally it is also possible for the transparent light guide to consist of a matrix plastic A and, distributed therein, scattering particles of a polymerizate B, the share of the scattering particles consisting of polymerizate B being 0.00001 to 5 wt.-% related to the matrix plastic A, and the refractive index nD(B) of the polymerizate B being at least 0.002 units above the refractive index nD(A) of the matrix plastic A.

In case they are not used in the shape of louvers, the scattering particles are homogeneously distributed in the light guide, so that the light guide does not have any inhomogeneous optical structure.

Further, the plate-shaped light guide has at least two large faces facing each other, which are arranged in parallel with, or tilted relative to each other. A wedge-shaped structure is possible as well, although parallel faces are of advantage. Useful thicknesses of the light guide typically are between including 0.5 mm and including 4 mm. Other thicknesses may be useful in particular cases.

For all embodiments there applies that the image display unit may be, for example, an LCD, OLED, plasma display, FED screen, SED screen, VFC screen or some other kind of screen. However, the image display unit—also called imager—may also be of a static nature, such as a backlit film or even a printed image. Other versions are possible as well.

Furthermore it may offer advantages if means for diminishing reflection, e.g., an antiglare and/or antireflection coating, are arranged on the top surface of the image display unit and/or on at least one of the large faces of the light guide. In connection with the invention, especially an antiglare coating will not only reduce direct reflections of external light spots, but also make it possible that the light radiated towards the image display unit by the light guide arranged in front of the image display unit is diffusely reflected back.

In all embodiments of the invention, the said light sources may be LEDs or rows of LEDs or laser diodes. Other versions are feasible and within the scope of the invention.

A special embodiment of the second alternative can be obtained if the light guide consists of two layers that are themselves light guides fabricated by an extrusion process. Here, the large faces of the layers should be as close to one another as possible in such a way that their extrusion directions are crossed. The reason is that the extrusion direction has a strong influence on the light-radiating characteristic of the light guides. If these directions are crossed, one can achieve, in front of the image display unit, a light outcoupling for superimposition on the light originating from the imager in both the left-right and the top-bottom direction.

In a preferred embodiment of the first alternative, the screen comprises further light guides. To particular advantage, another light guide is arranged in front of the light guide as seen in the viewing direction. On one of the large faces each of the light guide (3) and the other light guide, outcoupling elements are arranged or formed, with light sources (4) being arranged at one edge of the light guide (3) and at that edge of the other light guide which is opposite the former edge, and with the outcoupling elements defining an asymmetric light-radiating characteristic in such a way that the light is radiated into the quarter-space lying in the irradiating direction.

Generally, usable outcoupling elements are, for example, holographic structures or other microstructures, which may also be etched into the surface of the light guide. The asymmetric light-radiating characteristic manifests itself, e.g., in that light radiated into the light guide from a left edge is radiated into the quarter-space formed by the surface normal of the respective large face of the light guide and the irradiating direction—i.e., away from the light sources—, but not in the backward direction. The radiation range may, e.g., be a range extending from 20° to 50° relative to the surface normal.

In another preferred embodiment, the light sources are adapted to emit colored light. Colored light is understood to mean especially visible light that is not white, i.e., light in the colors of, e.g., red, green, blue, turquoise, yellow, cyan or magenta. Further, this light can optionally be emitted at varied levels of brightness.

Moreover, it is possible for the coloredness, e.g., the color and/or brightness of the light emitted by the light sources, to be modulated with time. In addition, the light sources can be implemented by different individual light sources or luminous elements, say RGB-LEDs in LED rows emitting light of different colors and/or different brightness either simultaneously or at a temporal and/or spatial offset.

In operating mode B2, then, the image perceived from oblique viewing directions blocked by the angular restriction is an area of the respective color depending on the configuration of the light sources, but, as a rule, it will not be a black or white area, because the colored light emitted by the light guide will, from an oblique viewing direction, visibly outglare even a bright image content. Without the use of colored light sources, the image perceived is a gray or white area, depending on the configuration of the light sources and of the light guide; as a rule, however, it will not be a black area, because the light emitted by the light guide will visibly outglare even a black image content.

The light sources may emit light of a color that is not present in the image presented by the transmissive image display unit. Alternatively, the light sources may emit light of a color that is present in the image presented by the transmissive imager or is close to such a color in the color spectrum. Also, the light sources may emit light of a color approximately corresponding to the color complementary to that present in the image presented by the transmissive imager.

Using the invented screen is of particular advantage in connection with the entry or display of confidential data, e.g., PIN numbers, E-mails, SMS texts or passwords at ATMs, payment terminals or mobile devices.

In all embodiments, each light guide provided has at least one light entry surface and at least one light exit surface, with the ratio between light exit surface and light entry surface being at least 4.

As a matter of principle, variation of the above-described parameters within certain limits does not affect the ingenuity of the invention.

Furthermore, the desired restricted angular ranges for mode B2 can be defined and implemented separately for viewing restriction in the horizontal and the vertical direction. For example, it might be useful to have a larger angle (or possible no restriction at all) in the vertical direction than in the horizontal one, for example if, at an ATM, persons of different body height are intended to see something, whereas viewing from the side is meant to be greatly restricted. For POS payment terminals, on the other hand, safety regulations often make it necessary in mode B2 to restrict vision both in the horizontal and vertical directions.

The invention works especially well if, in the restricted-view mode B2, i.e., with the light sources switched on, the image displayed on the screen is dimmed to a certain degree. Thereby, the superimposition effect that the light radiated by the light guide has on the light originating from the image is enhanced because the latter now has a lower luminous intensity, so that the effect of view restriction is improved. For an additional improvement of view restriction in this case, text displayed on the screen as an image may be presented, e.g., in black and gray rather than black and white.

The task of the invention is also solved by a screen operable in at least two modes, viz B1 for a free viewing mode and B2 for a restricted viewing mode, an image display unit, at least one plate-shaped and transparent light guide disposed in front of the image display unit as seen in the viewing direction, light sources arranged laterally along edges of the light guide (with the light guide consisting of a plastic and, distributed therein, scattering particles in the form of oblong louvers arranged in a parallel or crisscross manner, but with no scattering particles in the light guide portions outside the louvers), and/or outcoupling elements configured as described above and attached to or formed on at least one of the large faces of the light guide.

Resulting therefrom, in operating mode B1, with the light sources switched off, the light originating from the image display unit passes the light guide essentially unaffected, whereas in operating mode B2, with the light sources switched on, the light originating from the image display unit is then superimposed by light radiated by the light guide almost exclusively from the scattering particles arranged in louver form, whereby the visibility of an image presented on the image display unit is restricted in oblique viewing directions.

In operating mode B2, the image perceived from oblique viewing directions is a gray or white area, depending on the configuration of the light sources and the scattering particles, but, as a rule, it will not be a black area, because the light emitted by the light guide from the scattering particles arranged in louver form will visibly outglare even a black image content. It is also possible, though, to use colored light sources that are adapted to radiate light in one or several specified colors.

Eligible plastics are, e.g., acrylic glass or silicone rubber.

The said louver form my have, for example, a height of 50 µm to 400 µm and a width of about 10 µm to 40 µm. Such louvers may be spaced at, for example, 40 µm to 200 µm. These parameters define the effect of the scattering particles arranged in louver form, and, in particular, the viewing angle(s) at which the image content presented on the image display unit can be readily discerned, or the angular limits of an oblique view in x- and/or y-direction at which the glare by light from the scattering particles in the light guide becomes strong enough to markedly diminish the visibility of an image presented on the image display unit.

The light guide has, as a rule, a haze value of less than 10%, or preferably less than 4%, measured according to ASTM D1003. Further, titanium dioxide particles are particularly eligible as scattering particles. Other embodiments are possible as well, e.g., using particles of barium sulfate, silsesquioxane particles, cross-linked polystyrene particles, or particles of yet other kinds. Within the louver forms, the scattering particles are, as a rule, distributed essentially homogeneously.

Advantageously, the scattering particles used in the transparent light guides are titanium dioxide particles of a mean particle size of 150 to 500 nm, in a concentration of 0.01 to 300 wt.-ppm related to the weight of the respective light guide. With particular preference, the scattering particles used for the light guide(s) are titanium dioxide particles in a concentration of 0.1 to 50 wt.-ppm, or preferably 0.1 to 10 wt.-ppm, with the titanium dioxide particles having a mean particle size of 160 nm to 450 nm or, with particular preference, 170 nm to 400 nm. The light guides have a haze value within a range of 0.2 to 2% measured according to ASTM D1003.

Further, the light guides may contain at least 40 wt.-% or preferably at least 60 wt.-%, of polymethyl methacrylate, related to their weight.

It is possible that the transparent light guides each consist of a matrix plastic A and, distributed therein in louver form as described above, scattering particles of a polymerizate B, with the scattering particles consisting of polymerizate B having a share each of 0.01 to 3 wt.-% related to the matrix plastic A, and with the refractive index nD(B) of the polymerizate B exceeding the refractive index nD(A) of the matrix plastic A by at least 0.002 units.

Typically, useful thicknesses of the light guide are between including 0.15 mm and including 4 mm. Other thicknesses may be useful in particular cases Further, the light guide has at least two large faces facing each other, which are arranged in parallel with, or tilted relative to each other. A wedge-shaped structure is possible as well, although parallel faces are of advantage. In all embodiments, each light guide provided has at least one light entry surface and at least one light exit surface, with the ratio between light exit surface and light entry surface being at least 4. As a matter of principle, variation of the above-described parameters within certain limits does not affect the ingenuity of the invention.

Furthermore it may be of advantage if means for diminishing reflection, e.g., an antiglare and/or antireflection coating, are arranged on the top surface of the image display unit and/or on at least one of the large faces of the light guide in front of the image display unit. In connection with the invention, especially an antiglare coating will not only reduce direct reflections of external light spots, but also make it possible that the light radiated towards the image display unit by the light guide arranged in front of the image display unit is diffusely reflected back.

In all previously mentioned embodiments, the said light sources may be LEDs or rows of LEDs or laser diodes. Other versions are feasible and within the scope of the invention.

A special embodiment of this alternative solution is achieved if the scattering particles employed in the light guide in louver form are fluorescent particles that, when illuminated by UV light, radiate visible light, and if the light sources used are LEDs radiating UV light. The result achieved thereby for operating mode B2 is that the particles then emit visible light due to the fluorescent effect excited by the UV light.

Eligible image display units are, e.g., LCD screens, OLED screens or any other types of screen having an essentially flat surface.

Furthermore, the desired restricted angular ranges for mode B2 can be defined and implemented separately for viewing restriction in the horizontal and the vertical direction. For example, it might be useful to have a larger angle (or possible no restriction at all) in the vertical direction than in the horizontal one, for example if, at an ATM, persons of different body height are intended to see something, whereas viewing from the side is meant to be greatly restricted. For POS payment terminals, on the other hand, safety regulations often make it necessary in mode B2 to restrict vision both in the horizontal and vertical directions.

Using the invented screen is of particular advantage for entering or displaying confidential data, e.g., PIN numbers, E-mails, SMS texts or passwords, at ATMs, payment terminals or mobile devices.

A light guide for use in the invented screen described above can be manufactured according to the invention as follows: First, a great number of planar, transparent silicone rubber layers alternating with planar silicone rubber layers doped with scattering particles are laminated or adhesively bonded together by their faces. The planar lamination or bonding joints are then cured, before at least one light guide of a desired thickness is cut from the laminated or bonded body, with the cutting direction approximately normal to the surface of the said silicone rubber layers. Optionally, one or both of the large surfaces of the light guide are sealed by applying one or several cover layers on the respective large face.

The silicone rubber layers doped with scattering particles thus form the louvers. To make light guides with crossed louvers, two light guides, each provided with parallel louvers only, are made and then adhesively bonded with the louvers aligned at an angle of, say, 90 degrees.

According to the invention, the light guide intended for use in the invented screen described above can also be manufactured by another method that comprises the following steps: First, a plate of transparent thermoplastic or thermoelastic material is dressed with a tool so as to work concave, louver-shaped structures into the said plastic plate. This can be done, e.g., by pressing a tool into the plate before it solidifies, or by milling, laser treatment or other suitable processes. Subsequently, the concave, louver-shaped structures are filled with a suitable emulsion containing scattering particles; surplus residues of the said emulsion are removed from the plate. Optionally, the emulsion may be cured by means of energy input, e.g., by UV light, visible light or heat. Also optionally, then, one or both large faces of the plastic plate can be sealed by applying a cover layer, e.g., by laminating a PET film or a polycarbonate substrate, or by coating with some transparent protective sealing varnish.

It is understood that the features mentioned before and those to be explained below are applicable not only in the combinations stated but also in other combinations or as stand-alone features without leaving the scope of the present invention.

BRIEF DESCRIPTION OF THE DRAWINGS

Below, the invention will be explained in more detail with reference to the accompanying drawIngs, which also show features essential to the invention, among others, and in which.

The drawings are not to scale. They only illustrate principles, some of them as sectional views.

DETAILED DESCRIPTION OF THE DRAWINGS

Figure 1:
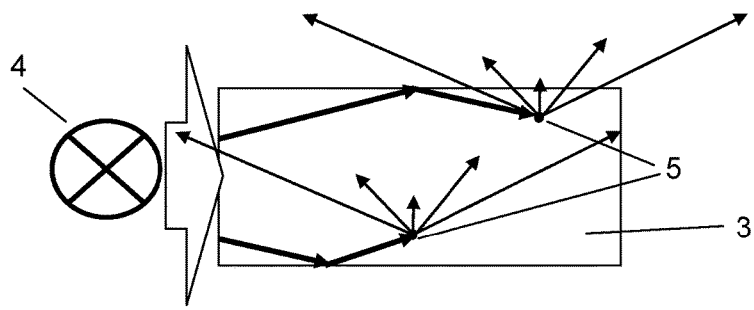
FIG. 1 is a sectional view illustrating how light laterally coupled into a light guide is outcoupled with a defined radiation characteristic.

FIG. 1 is a sketch illustrating the principle of how light laterally coupled from light sources 4 into a light guide 3—shown here as a small detail only in a sectional view—is outcoupled with a defined radiation characteristic. The small dots represent scattering particles 5 that scatter the light laterally coupled in from the light sources 4. Due to total reflection, rays of the coupled-in light (represented by bold rays) are reflected by the outer wall and thrown back into the light guide 3 until they finally hit scattering particles 5 to undergo the desired outcoupling. This outcoupling is represented by a cluster of five thin arrows per scattering particle 5: The long rays pointing more sideways represent greater light outcoupling into angular ranges positioned at a greater distance from the surface normal of the light guide 3. The shorter rays illustrate that less light is coupled out in angular ranges that are closer to the surface normal of the light guide 3, while the minimum of light is coupled out in the direction of the surface normal of the light guide 3, indicated here by the shortest arrow pointing up. For better understanding, the representation in FIG. 1 is highly schematic; in reality, the light guide 3 has a vast number of ray paths and scattering particles 5.

Figure 2:
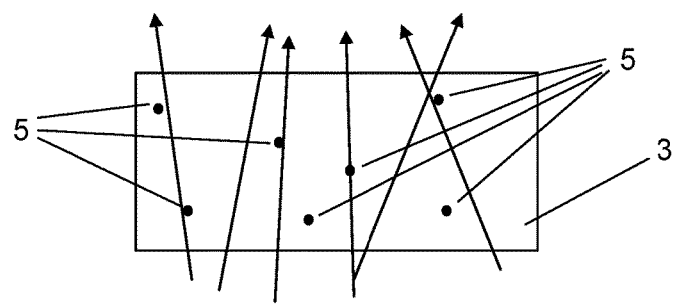
FIG. 2 is a sectional view illustrating the passage of light originating from an image display unit through a light guide.

FIG. 2 is a sketch illustrating the principle of light originating from an image display unit 2 (not shown in the drawing) being passed through a light guide 3. Here, the scattering particles 5 in the light guide 3 play a part that is essentially negligible, because the light originates from the image display unit 2, i.e., the light is not coupled in laterally through an edge from light sources 4, and therefore it is not, or scarcely, deflected back and forth by total reflection in the light guide 3. Similarly, in operating mode B1, the image information modulated upon the light coming from the image display unit 2 passes the light guide 3 almost unaffected.

Figure 3:
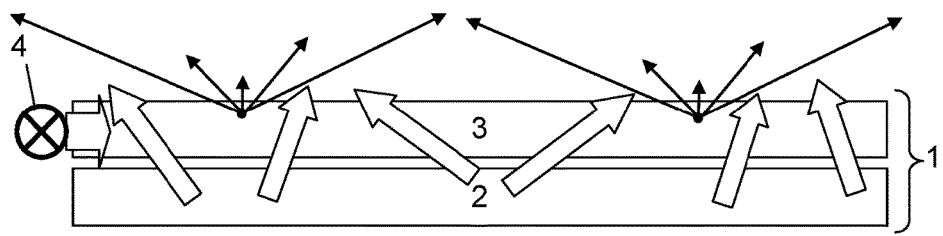
FIG. 3 is a sectional view of a screen in operating mode B2 for a restricted viewing mode, with the light modulated by the imager being superimposed by light from a light guide in order to achieve privacy protection.

FIG. 3 is a sketch illustrating the principle of a screen 1 in operating mode B2 for a restricted viewing mode, with the light modulated by the image display unit 2 being superimposed by light from the light guide 3 in order to achieve privacy protection.

FIG. 3 shows an image display unit 2, for example an LCD or OLED display, a plate-shaped, transparent light guide 3 with an average haze value less than 10%, measured according to ASTM D1003, disposed in front of the image display unit 2 as seen in the viewing direction, and light sources 4 arranged laterally at an edge of the light guide 3; advantageously, further light sources 4 are attached to the opposite edge. Preferably eligible as light sources are, e.g., cold-white LEDs, arranged, e.g., in rows.

In operating mode B2, the light sources 4 are switched on so that, in a first alternative, either due to scattering particles 5—not shown in FIG. 3—distributed in the light guide 3 in space and/or with regard to their concentration, or due to outcoupling elements arranged or formed on at least one of the large faces—here, the upper large face—of the light guide, a light-radiating characteristic is produced at which the average luminance, measured at angles $\alpha$ relative to the surface normal of the at least one large face of the light guide, with $0° \leq \alpha \leq \theta$, is, with $10° \leq \theta \leq 60°$, smaller by a factor X, with $X \geq 1.2$, than the highest measurable luminance—which means the highest measurable single value—on the same large face of the light guide, radiated at angles $\alpha > \theta$ relative to the surface normal. The angle $\theta$ may be, for example, 10°, 30°, 30°, 45° or any other meaningful value.

In a second alternative, the image display unit 2 has a light-radiating characteristic at which the luminance achieved in the direction of the surface normal of the image display unit 2 is higher than that achieved at an angle of $\alpha \geq \theta$ relative to that surface normal.

Thereby, in operating mode B2, the light that originates from the image display unit 2 (represented in FIG. 3 by broad, hollow arrows) and that has image information modulated on, is superimposed by light radiated by the surface of the light guide 3 (shown here by thin arrows of varied length similar to those in FIG. 2). In that way, the visibility from viewing angles $\alpha > \theta$ of the image information presented on the image display unit is diminished or even excluded.

Here, the angle $\alpha$ can be measured along the horizontal, the vertical and/or any other direction of the screen 1, but always relative to the surface normal. If, for example, the given conditions apply to a horizontal and vertical angle measurement, the screen 1 in operating mode B2 cannot be viewed at oblique angles from the left, right, top or bottom. If, however, the given conditions apply to a horizontal angle measurement only, the screen 1 in operating mode B2 cannot be viewed at oblique angles from the left and right only, whereas viewing from the top and bottom is possible, as a rule.

Figure 4:
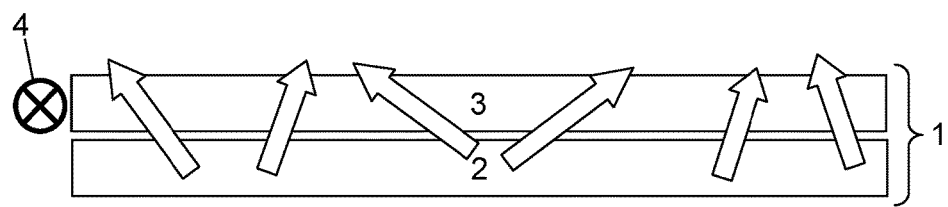
FIG. 4 is a sectional view of the screen in operating mode B1 for a free viewing mode, with the light modulated by the imager not being superimposed by light from a light guide.

Compared with this, FIG. 4 illustrates the principle of the screen 1 in operating mode B1 for a free viewing mode, wherein the light modulated by the image display unit 2 (broad, hollow arrows) is not superimposed by light coming from the light guide 3, because the light sources 4 are switched off now. Therefore, the light of the image display unit 2 passes the light guide 3 essentially unaffected and thus reaches the viewer in an essentially unaffected state.

Here, as well as in other embodiments, the quantity X mentioned above can be chosen to have other values, say, $X \geq 2.5$ or $X \geq 4$, 5, 6, 10, 20, 50, 100 or even higher. It is a measure of how much more light is radiated by the light guide into "lateral" viewing angles than in the direction of the surface normal.

In an advantageous embodiment of the screen 1, the scattering particles 5 are worked into the light guide 3 in the form of microlouvers 7, with the microlouvers 7 in turn being embedded in a transparent, non-scattering material. Typically, the microlouvers may have a thickness between 30 μm and 150 μm and a height between 30 μm and 300 μm. The average center distance from one microlouver to the next may, as a rule, be between 40 μm and 150 μm. Other values are possible, too. What is important is that the ratio of height to center distance is great enough to couple out sufficient light from an oblique view of the microlouvers.

Figure 5:
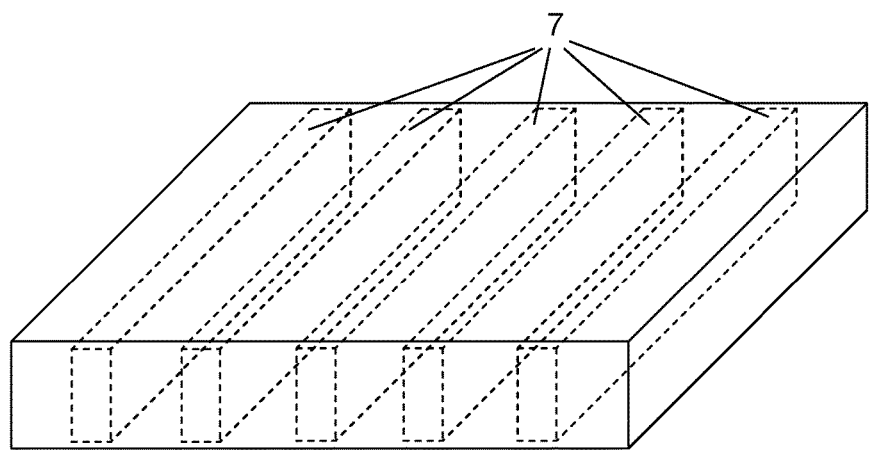
FIG. 5 is a sketch illustrating the principle of an advantageous embodiment of the light guide with parallel microlouvers.
Figure 6:
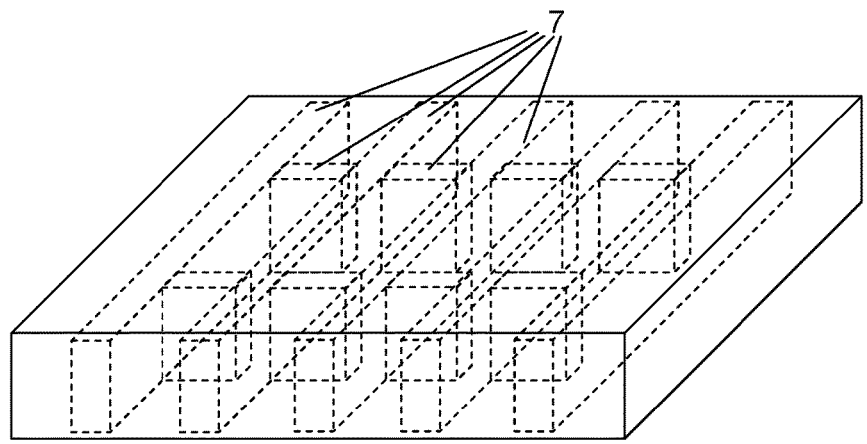
FIG. 6 is a sketch illustrating the principle of an advantageous embodiment of the light guide with crossed microlouvers.

In this connection, the principle of an advantageous embodiment of the light guide 3 with parallel microlouvers 7 is illustrated by FIG. 5, whereas the principle of another advantageous embodiment of the light guide 3 with crossed microlouvers is illustrated by FIG. 6.

Further, the microlouvers 7 may be configured in parallel—see FIG. 5—and/or crossed at some angle—see FIG. 6, where, for greater clarity, not all microlouvers 7 are marked. If the microlouvers 7 are configured in parallel, the result of light outcoupling from them is that light superimposition on the image information displayed reduces visibility in one dimension only, e.g., left-to-right or top-to-bottom. If, however, the microlouvers 7 are configured in a crossed manner, e.g., crossed rectangularly, the result of light outcoupling from them is that light superimposition on the image information displayed reduces visibility in two dimensions, i.e., simultaneously left-to-right and top-to-bottom.

In one feasible implementation of this embodiment, the microlouvers 7 consist of a silicone rubber with scattering particles 5 added to it. In this case, the scattering particles 2 may, for example, be titanium dioxide or barium sulfate particles, silsesquioxane particles, and/or cross-linked polystyrene particles, with the microlouvers 7 themselves being embedded in transparent silicone rubber.

Alternatively, the microlouver structure can be employed also without scattering particles 5. In this case, the scattering particles are distributed in the light guide 3 essentially homogeneously, as described hereinbefore.

Figure 7:
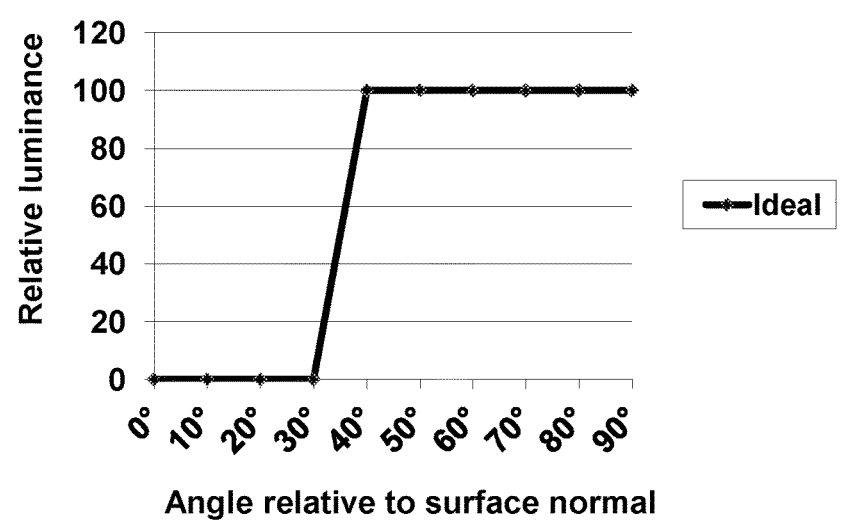
FIG. 7 shows a luminance curve for ideal outcoupling conditions of the light guide.
Figure 8:
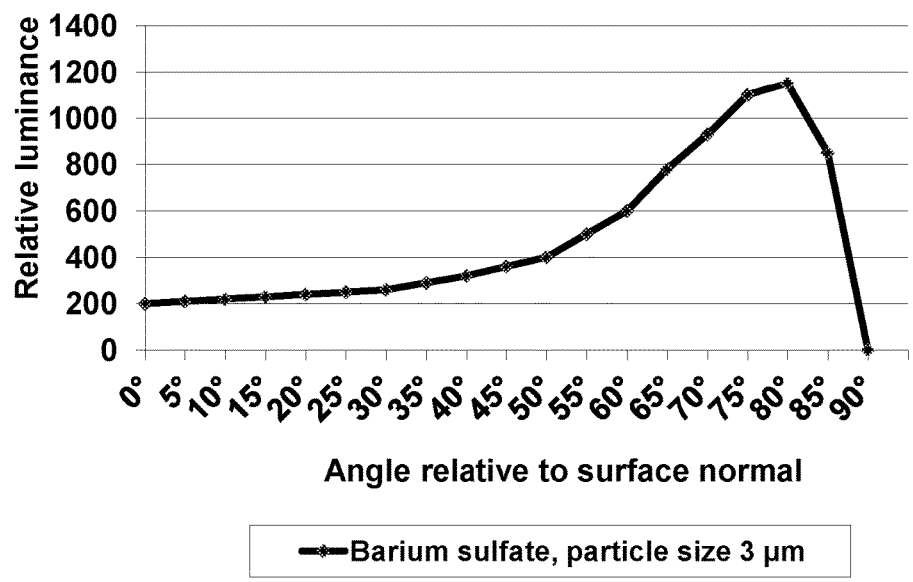
FIG. 8 shows a luminance curve for real outcoupling conditions of a light guide containing scattering particles of barium sulfate.

FIG. 7 illustrates an example of the behavior of the relative luminance as a function of the angle relative to the surface normal, for ideal outcoupling conditions of the light guide 3, in this case for an angle $\theta=30°$. In such an ideal case, on at least one of the large faces of the light guide 3 there would predominate a light-radiating characteristic at which, in an angular range of 0° a 30° relative to the surface normal, almost no light is coupled out, and at which, in an angular range of 30° a 90° relative to the surface normal, light is radiated with a luminance that is preferably almost as high as, or even higher than the luminance of the screen 1 in this direction. However, this ideal case is hardly realizable in practice. Accordingly, FIG. 8 shows a behavior of the relative luminance for real outcoupling conditions of an example of light guide 3 containing scattering particles 5 barium sulfate.

Thereby, a radiation characteristic of the light guide 3 can be achieved with which markedly less light is coupled out at narrow angles than at wide angles (e.g., greater than 30° or 45°) relative to the surface normal of the light guide, which is the desired effect.

Figure 9:
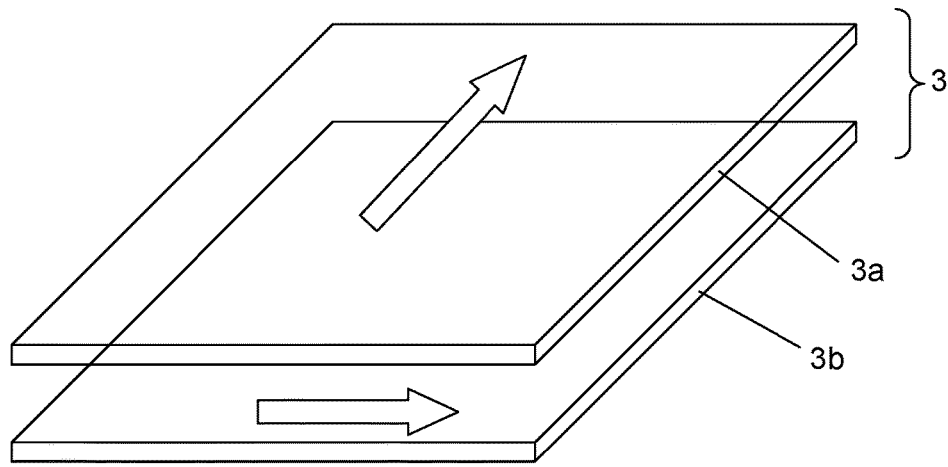
FIG. 9 shows a special embodiment of a screen, in which the light guide consists of two layers each of which is itself a light guide.

A special embodiment can be implemented if, as sketched in FIG. 9, the light guide 3 consists of two layers 3a, 3b that themselves are light guides fabricated by an extrusion process, with the large faces of the layers 3a, 3b being closely adjoining each other in such a manner that their extrusion directions—represented by arrows—cross each other. The reason is that the extrusion direction has a strong influence on the light-radiating characteristic of the light guides 3. If these directions are crossed, one can achieve, in front of the image display unit 2, a light outcoupling for superimposition on the light originating from the image display unit 2 in both the left-right and the top-bottom direction. Light from the light sources 4 is then coupled into both layers 3a, 3b of the light guide 3.

FIG. 4 may also serve to envisage the screen 1 of the second alternative, in which the image display unit 2 has a corresponding light-radiating characteristic.

In operating mode B1, the light sources 4 are switched off here, so that the light originating from the image display unit, with the image information modulated on it, passes the light guide 3 essentially unaffected.

In operating mode B2, however, which is not drawn separately, the light sources 4 are switched on, so that the light originating from the image display unit, with image information modulated on it, is superimposed by light radiated from the large face of the light guide 3, whereby the visibility of the image information presented on the image display unit 2 is diminished or even blocked from viewing angles $\alpha>\theta$. An image display unit 2 suitable for the second alternative can be generated, e.g., by using, in an LCD, crossed OLFs and/or crossed BEFs for light concentration between the LCD panel and the backlight.

What is essential is that, on the whole, the relative brightness of the light coming from light guide 3 is higher than the light originating from the image display unit 2 at angles for which viewing is to be blocked, whereas at angles not to be blocked, the conditions are quite the opposite, i.e. with the light of the image display unit 2 being brighter than the superimposed light from the light guide 3.

For the above solution version of the screen 1 according to the second alternative, there applies that the light guide 3 may consist of a transparent thermoplastic or thermoelastic material with scattering particles 5 essentially homogeneously distributed therein, with the scattering particles 5 consisting, e.g., of titanium dioxide or barium sulfate, or being silsesquioxane particles or cross-linked polystyrene particles.

Preferably, the scattering particles 5 used in the transparent light guide 3 are titanium dioxide particles of a mean particle size of 150 to 500 nm in a concentration of 0.01 to 300 wt.-ppm related to the weight of the respective light guide 3. With particular preference, the light guide(s) 3 is/are provided with scattering particles of titanium dioxide in a concentration of 0.1 to 50 wt.-ppm or, even better, of 0.1 to 10 wt.-ppm. These titanium dioxide particles have a mean particle size of 160 to 450 nm or, with particular preference, 170 to 400 nm. The haze value of the light guides 3 is within a range of 0.2 to 2%, measured according to ASTM D1003.

Regarding the scattering particles 5, though, it is also possible to use barium sulfate particles of about 3 μm particle size, cross-linked polystyrene particles of about 4 μm particle size or silsesquioxane particles of about. 2 μm particle size in suitable concentrations.

Furthermore, the light guide 3 may contain at least 40 wt.-% or preferably at least 60 wt.-% of polymethyl methacrylate related to its weight.

Thereby, one can achieve a radiation characteristic of the light guide 3 with which markedly less light is coupled out at narrow angles than at wide angles, e.g., greater than 30° or 45°, relative to the surface normal of the light guide 3.

Further, the plate-shaped light guide has at least two large faces opposite to each other, arranged either in parallel or tilted relative to each other. A wedge-shaped structure is also possible, although parallel large faces are of advantage. Useful thicknesses of the light guide are typically between including 0.5 mm and including 4 mm. Other thicknesses may also be useful in certain cases.

In all embodiments, the image display unit may be, for example, an LCD, OLED, plasma, FED, SED, VFC or other type of screen. Also, the image display unit may be of a static nature, such as a backlit film or even a printed image. Other versions are possible as well.

In all embodiments of the invention, the said light sources may be LEDs, LED rows, or laser diodes. Other versions are feasible without departing from the scope of the invention.

Figure 10:
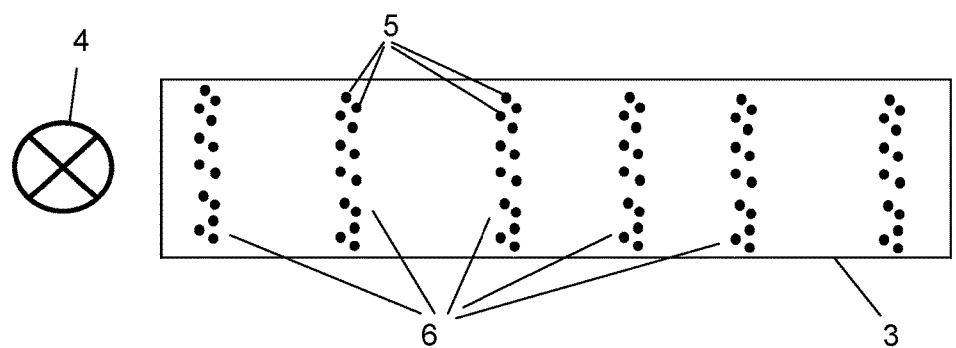
FIG. 10 is a sketch illustrating the principle of configuring a light guide with scattering particles arranged in louver form, with the light sources switched off.

FIG. 10 illustrates the principle of configuring a light guide 3 with scattering particles 5 arranged in louver form 6, with the light sources 4 switched off.

Figure 11:
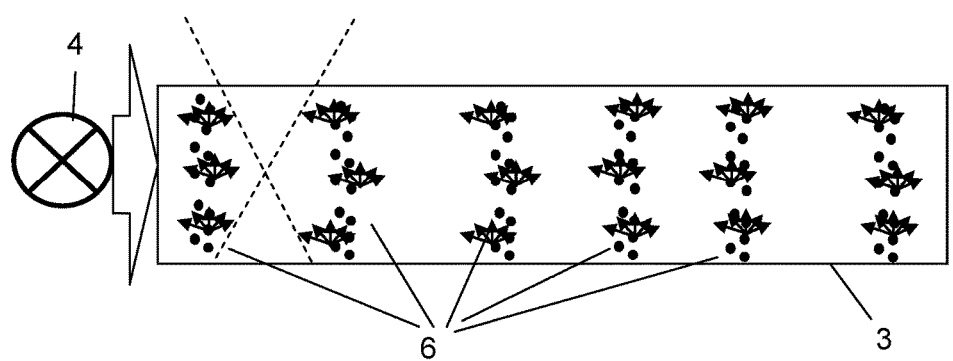
FIG. 11 is a sketch illustrating the principle of configuring a light guide with scattering particles arranged in louver form, with the light sources switched on, FIG. 12 is a sketch illustrating the principle of the invented screen in operating mode B2 for a restricted viewing mode, and FIG. 13 *e* is a sketch illustrating the principle of the invented screen in operating mode B1 for a free viewing mode.

By contrast, FIG. 11 illustrates the principle of configuring a light guide 3 with scattering particles 5 arranged in louver form 6, with the light sources 4 switched on now. This drawing also shows, represented by short arrows, light rays originating from the scattering particles 5 arranged in louver form 6, these particles consisting, e.g., of titanium dioxide in the concentrations and sizes described above. The two crossed dashed lines indicate that, with the light sources 4 in the switched-on state, a view through the light guide 3 is restricted due to the light radiated by the scattering particles 5.

Figure 12:
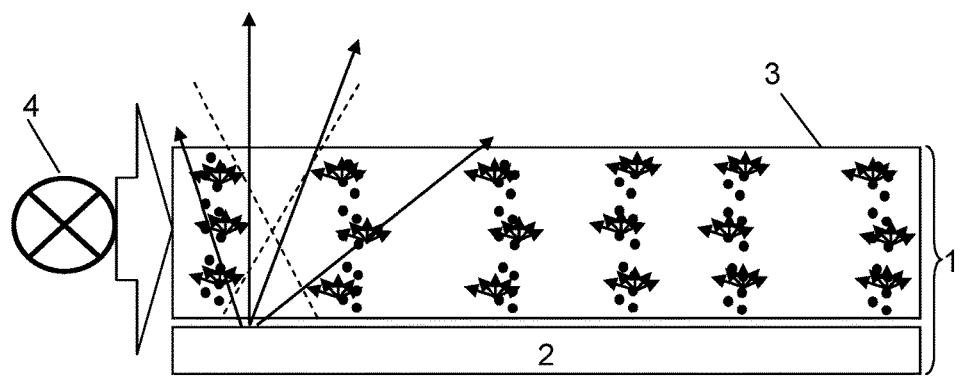

FIG. 12 illustrates the principle of a screen 1 with such a light guide 3 and an image display unit 2 in operating mode B2 for a restricted viewing mode. The light sources 4 are switched on, corresponding to FIG. 11. Thus, the light rays originating from the image display unit 2—shown here by long, solid lines—are superimposed by light emanating from the scattering particles 5.

As a result, a viewer looking from the top has an unimpeded view of the image display unit 2 from a restricted angular range only, which is indicated by the dashed lines. For a viewer looking obliquely, the superimposition of light from the scattering particles 5 ensures that the image presented on the image display unit 2 is completely, or at least partially, dissolved. This enables the operating mode B2.

Analogously, FIG. 12 may also serve to explain the configuration with fluorescent particles as scattering particles 5 in the light guide 3: In this case, in operating mode B2, the light sources 4 emit UV light, which is conducted by the light guide 3 to the scattering particles arranged in louver form and excites these particles to emit light in the visible spectrum. For a viewer looking obliquely, superimposition of this light from the scattering particles 5 ensures that the image presented on the image display unit 2 is completely, or at least partially, dissolved. This enables the operating mode B2.

Figure 13:
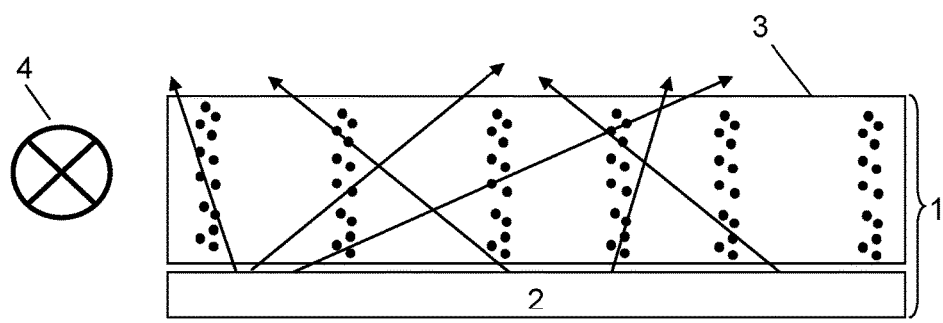

Finally, FIG. 13 illustrates the principle of a screen 1 with the image display unit 2 in operating mode B1 for a free viewing mode. Corresponding to FIG. 10, the light sources 4 are switched off. Thus, the light rays originating from the image display unit 2—shown here by long, solid lines—are not superimposed by light, because no light is emanating from the scattering particles 5. As a result, a viewer looking from the top has an unimpeded view of the image display unit 2 from any angle, as the scattering particles 5 essentially have no effect on the light originating from the image display unit 2.

The light guides described above as part of a screen can be placed on the front face of the screen so as to be applicable with the broadest possible scope of screen types, such as, e.g., LCD and OLED screens. No interference, e.g., with the backlighting of LCDs is required.

The screens described before provide solutions that are well implementable in practice to realize secure presentation of information by means of optionally restrictable viewing angles, whereas making a separate operating mode available for free viewing with the least possible restriction of the viewing angle. The invention can be implemented by simple means and at affordable cost. The native resolution of the imagers employed can be utilized in both operating modes. Moreover, the solution involves little or no light loss, depending on the embodiment.

The invention described herein above can be used to advantage wherever confidential data are displayed and/or entered, such as in entering PINs, and/or displaying data at ATMs or payment terminals, entering passwords, or reading E-mails on mobile devices.

LIST OF REFERENCES 1 screen
2 image display unit
3 light guide
3a, 3b layers of the light guide
4 light sources
5 scattering particles
6 louver form
7 microlouver
B1 operating mode for a free viewing mode
B2 operating mode for a restricted viewing mode

What is claimed is:

1. A screen that can be operated in at least two operating modes, for a free-viewing-mode and a restricted viewing mode, comprising:
   an image display unit,
   a plate-shaped, transparent light guide disposed in front of the image display unit as seen in the viewing direction, and
   light sources arranged laterally at edges of the light guide, wherein:
   the image display unit is arranged behind the light guide as seen in the viewing direction,
   the light guide has a haze value of less than 20%, measured according to ASTM D1003,
   wherein in the free-viewing mode, the light sources are switched off, so that the light originating from the image display unit, with image information modulated upon it, passes the light guide essentially unaffected, and
   wherein in the restricted-viewing mode the light sources are switched on, and, in a first alternative, either due to scattering particles distributed in the light guide in space and/or regarding their concentration, or due to outcoupling elements arranged or formed on at least one of the large faces of the light guide, a light-radiating characteristic is produced at which the average luminance, measured at angles α relative to the surface normal of the at least one large face of the light guide with 0°≤α≤θ, is, with 10°≤θ≤60°, smaller at least by a factor X, with X≥1.2, than the highest measurable luminance on the same large face F1 of the light guide, radiated at angles α>θ relative to the surface normal, and/or wherein, in a second alternative, the image display unit has a light-radiating characteristic at which the luminance achieved in the direction of the surface normal of the image display unit is higher than that achieved at an angle of α≥θ relative to that surface normal,
   so that in the restricted-viewing mode the light originating from the image display unit, with image information modulated upon it, is superimposed by light radiated by the surface of the light guide over a wide angular range, whereby, from viewing angles α>θ, the visibility of the image information presented on the image display unit is diminished.

2. The screen as claimed in claim 1, wherein the haze value of the light guide is less than 10%, and/or the angle θ is 10°, 30°, 30° or 45°, and/or the factor X is ≥2.5.

3. The screen as claimed in of claim 1, wherein the angle θ can be specified as a function of the quantity of light irradiated.

4. The screen as claimed in claim 1, wherein when scattering particles are provided, the light guide consists of a transparent, thermoplastic or thermoelastic material, in which the scattering particles are distributed essentially homogeneously, with the scattering particles consisting of titanium dioxide, barium sulfate or silsesquioxane particles or of cross-linked polystyrene particles.

5. The screen as claimed in claim 4, wherein the transparent light guide consists of a matrix plastic A and, distributed therein, scattering particles of a polymerizate B, with a share of the scattering particles of polymerizate B being 0.00001 to 5 wt.-% related to the matrix plastic A, and a refractive index nD(B) of the polymerizate B being at least 0.002 units above a refractive index nD(A) of the matrix plastic A.

6. The screen as claimed in claim 1, second alternative, wherein the light guide consists of two layers, which themselves are light guides manufactured by an extrusion process, with the layers having their large faces bear against each other in such a way that their extrusion directions cross each other.

7. The screen as claimed in claim 1, first alternative, wherein another light guide is arranged in front of the light guide as seen in the viewing direction, and that outcoupling elements are arranged or formed on one of the large faces of the light guide and the other light guide, wherein light sources are arranged at one edge of the light guide and at the edge, facing that light guide edge, of the other light guide, and wherein the outcoupling elements define an asymmetric light-radiating characteristic in such way that light is radiated into the quarter-space lying in the irradiation direction.

8. The screen as claimed in claim 1, wherein the light sources radiate light of a color that does not occur in the image presented on the image display unit.

9. The screen as claimed in claim 1, wherein the light sources radiate light of a color that occurs in the image presented on the image display unit or is close to such a color in the color spectrum.

10. The screen as claimed in claim 1, wherein the light sources radiate light of a color approximately corresponding to the color that is complementary to a color occurring in the image presented on the image display unit.

11. The screen as claimed in claim 1, wherein:
the light guide consists of plastic,
scattering particles in the form of parallel or crossed oblong louvers are distributed in the light guide, however, with no scattering particles being contained in the light guide outside the louvers, and/or with outcoupling elements being formed on or applied to at least one of the large faces of the light guide,
whereby in the free-viewing mode, in which the light sources are switched off, the light coming from the image display unit passes the light guide essentially unaffected, and
whereby in the restricted-viewing mode, in which the light sources are switched on, the light coming from the image display unit is superimposed on by light that the light guide now almost exclusively radiates from the scattering particles arranged in louver form, whereby, for someone looking at the image display unit obliquely, the visibility of an image presented on the image display unit is restricted.

12. The screen as claimed in claim 11, wherein the scattering particles employed in the transparent light guide are titanium dioxide particles of a mean particle size of 150 to 500 nm in a concentration of 0.01 to 300 wt.-ppm related to the weight of the light guide.

13. The screen as claimed in claim 11, wherein the transparent light guide consists of a matrix plastic A and, distributed therein, scattering particles of a polymerizate B, with a share of the scattering particles of polymerizate B being 0.01 to 3 wt.-% related to the matrix plastic A, and a refractive index nD(B) of the polymerizate B being at least 0.002 units above a refractive index nD(A) of the matrix plastic A.

14. The screen as claimed in claim 11, wherein the scattering particles employed are fluorescent particles which, when illuminated with UV light, radiate visible light, and in that the light sources employed are LEDs which emit UV light.

15. The screen as claimed in claim 11, wherein an antiglare and/or antireflection coating for diminishing reflection, are arranged on a top surface of the image display unit and/or on at least one of the large faces of the light guide.

16. The screen as claimed in claim 11, wherein the light sources are adapted to emit light in one or several specified colors.

17. Use of a screen as claimed in claim 11 for entering or displaying confidential data, such as PINs, E-mails, SMS texts or passwords, at ATMs, payment terminals or mobile devices.

18. A method for manufacturing a light guide for use according to claim 11, comprising the following steps:
planar lamination or adhesive bonding of a great number of planar, transparent silicone rubber layers alternating with planar silicone rubber layers doped with scattering particles,
curing the said planar laminated or adhesively bonded joints,
cutting off at least one light guide of the desired thickness from the laminated or adhesively bonded body thus obtained, with the cutting direction being approximately normal to the surface of the said silicone rubber layers.

* * * * *

UNITED STATES PATENT AND TRADEMARK OFFICE
CERTIFICATE OF CORRECTION

PATENT NO. : 10,310,302 B2
APPLICATION NO. : 16/060869
DATED : June 4, 2019
INVENTOR(S) : Markus Klippstein et al.

Page 1 of 1

It is certified that error appears in the above-identified patent and that said Letters Patent is hereby corrected as shown below:

In the Specification

In Column 1, Line 37, delete "films" and insert -- films. --, therefor.

In Column 8, Line 27, delete "my" and insert -- may --, therefor.

In Column 9, Line 5, delete "cases" and insert -- cases. --, therefor.

In Column 10, Line 33, delete "drawIngs," and insert -- drawings, --, therefor.

In the Claims

In Column 18, Claim 17, Line 31, delete "claim 11" and insert -- claim 11, --, therefor.

Signed and Sealed this
Sixth Day of August, 2019

Andrei Iancu
*Director of the United States Patent and Trademark Office*